March 9, 1926.                                                    1,575,708
J. F. O'CONNOR
FRICTION SHOCK ABSORBING MECHANISM
Filed April 25, 1923        2 Sheets-Sheet 2
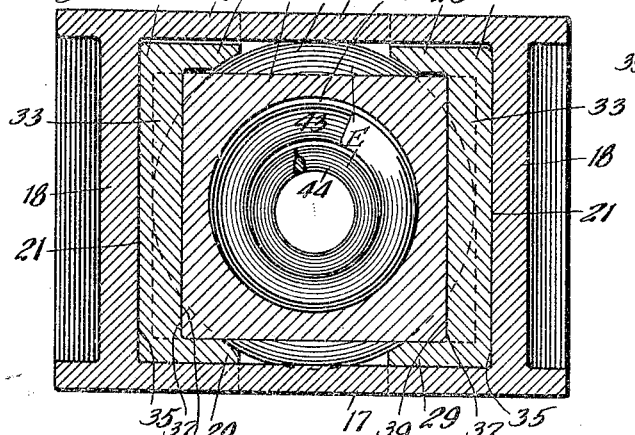
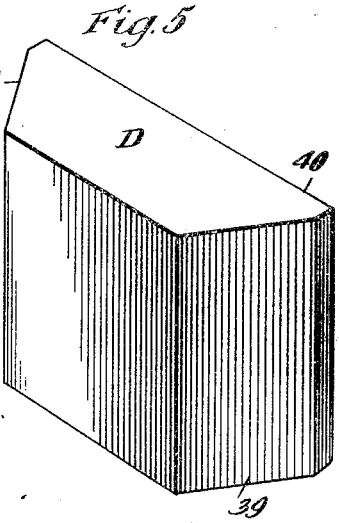
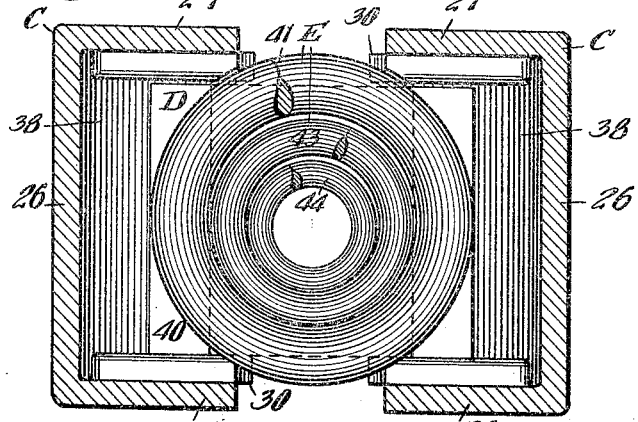
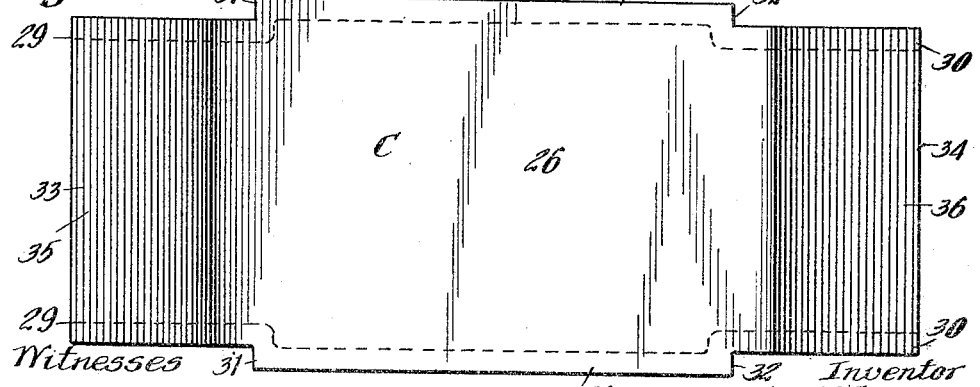
Inventor
John F. O'Connor
By George J. Haight
His Atty.
Witnesses
Wm. Geiger Patented Mar. 9, 1926.

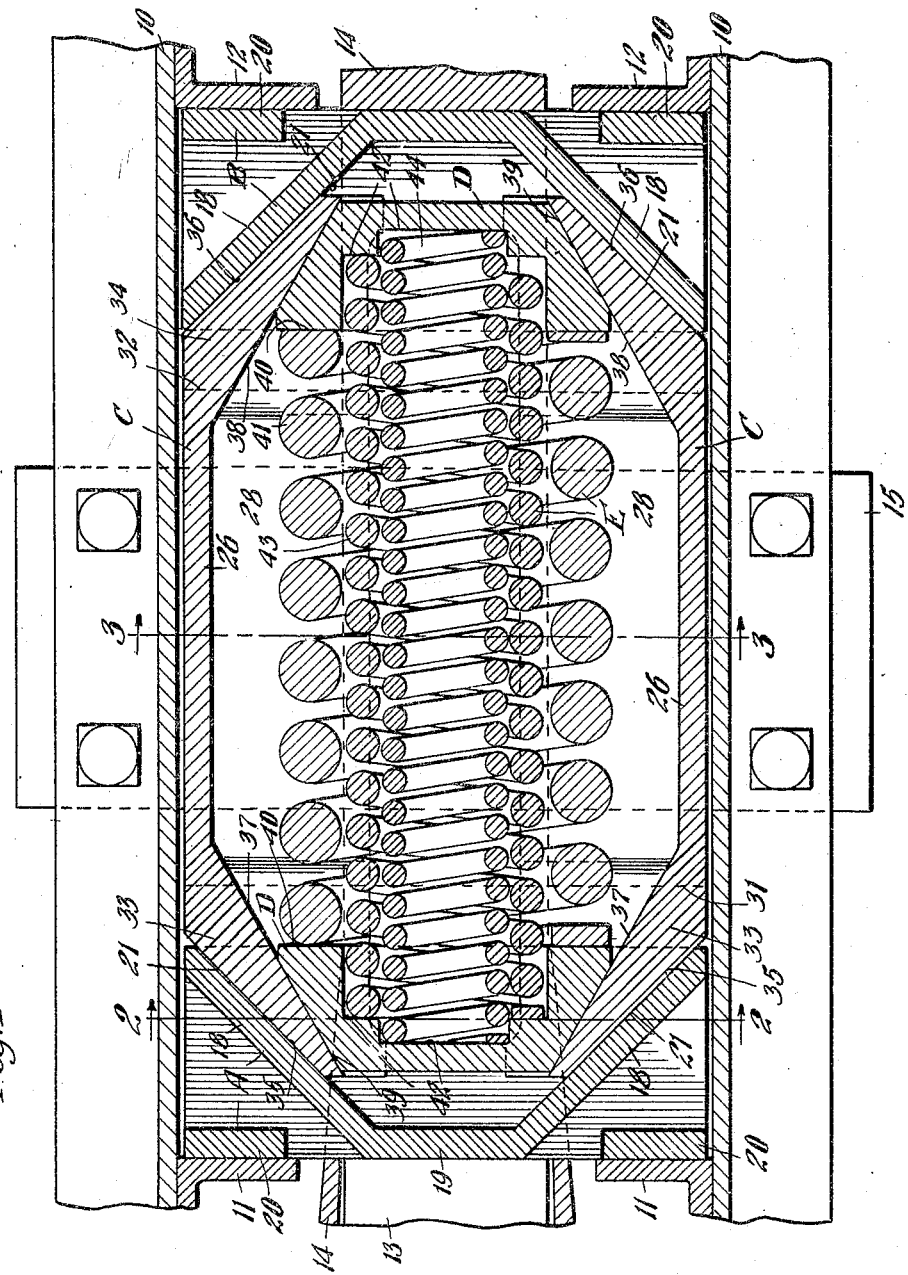

1,575,708

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed April 25, 1923. Serial No. 634,423.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to friction shock absorbing mechanisms.

The object of this invention is to provide a friction shock absorbing mechanism especially adapted for railway draft riggings, wherein high capacity is combined with certain release, by employment of an arrangement of acute and blunt angle wedging faces.

Other objects and advantages of the invention will more clearly appear from the description and claims hereinafter following.

In the drawing forming a part of this specification, Fig. 1 is a horizontal, longitudinal sectional view of a draft rigging showing my improvements in connection therewith. Fig. 2 is a vertical, transverse, sectional view corresponding substantially to the line 2—2 of Fig. 1. Fig. 3 is a vertical, transverse, sectional view corresponding substantially to the line 3—3 of Fig. 1. Fig. 4 is a side elevational view of one of the friction shoes. And Fig. 5 is a detail perspective view of one of the spring followers.

In said drawing, 10—10 denotes channel draft sills of a car under-frame, to the inner faces of which are secured front stop lugs 11—11 and rear stop lugs 12—12. A portion of the draw-bar is indicated at 13, the same being operatively associated with a hooded yoke 14, wherein is disposed the shock absorbing mechanism proper. The yoke and shock absorbing mechanism therewithin are supported in operative position by a detachable saddle plate 15.

The improved shock absorbing mechanism proper, as shown, comprises broadly, a front follower A; a rear follower B; a pair of friction shoes C—C; spring followers D—D; and a spring resistance E.

The front and rear main followers A and B are of like construction and are adapted to co-act with the front and rear stop lugs, respectively. Each said follower comprises spaced top and bottom walls 16 and 17, inwardly diverging vertical side walls 18—18, a vertical end wall 19 connecting the outer ends of the side walls 18, and a pair of vertically extending webs 20 disposed at opposite sides of the follower and connecting the top and bottom walls 16 and 17 thereof. The webs 20 are adapted to abut the corresponding stop lugs and co-act therewith in a well known manner. The side walls 18 of each follower are inclined to relatively blunt angles with reference to the longitudinal axis of the mechanism and the inner faces 21 thereof are adapted to form wedge faces co-acting with the wedge shoes C.

The friction shoes C are two in number and are arranged at opposite sides of the mechanism. Each of the friction shoes is provided with a longitudinally extending side wall 26, provided with upper and lower inwardly extending flanges 27 and 28, respectively. At the opposite ends of the friction shoes C, the upper and lower flanges 27 and 28 are offset inwardly, as clearly shown in Figs. 3 and 4, thereby providing reduced outer end portions 29 and 30 at the front and rear ends thereof and upper and lower front and rear shoulders 31 and 32, respectively. The reduced ends 29 and 30 are of such a height as to be accommodated between the top and bottom walls of the front and rear followers A and B, and the shoulders 31 and 32 are adapted to co-act with the inner ends of the top and bottom walls of the front and rear followers respectively to act as stops and limit the relative movement of the followers. Each of the friction shoes C is also provided with inwardly diverging end walls 33 and 34. The outer faces 35 and 36 of the end walls 33 and 34 are correspondingly inclined to the faces 21 of the front and rear followers. The inner faces 37 and 38 of the walls 33 and 34 extend at different inclinations with reference to the longitudinal axis of the mechanism, than the outer faces 35 and 36 and provide wedge faces extending at a relatively keen angle with reference to the longitudinal axis of the mechanism.

The spring followers D are arranged at opposite ends of the mechanism and are of like construction. Each of the spring followers D is provided with a pair of outwardly converging wedge faces 39 adapted to co-act with the adjacent wedge faces 38 of the shoes C. Each of the spring followers D is also provided with a flat inner face 40 adapted to form an abutment for one end of the outer relatively heavy coil 41 of the spring resistance E, and is further provided with a counter-sunk recess 42 adapted to receive the ends of the springs 43 and 44 disposed within the coil 41. In this connection it is pointed out that the front and rear spring followers D rest upon the bottom flanges of the friction shoes C, and that the ends of the friction shoes are in turn supported by the bottom walls of the front and rear followers.

The operation of the mechanism during a compression stroke and assuming a buffing action, is as follows. As the front follower A is moved towards the rear follower B, the wedge friction shoes C—C are forced to travel laterally inwardly toward the axis of the mechanism and as the same travel inwardly due to the wedging action between the co-acting faces of the same and the followers, the spring followers will be moved longitudinally toward each other due to the wedging action of the inner wedge faces of the shoes co-acting with the wedge faces of the spring followers, thereby compressing the spring resistance E. As the wedging angles between the shoes and the spring followers are keener than the wedging angles between the main followers and the shoes, it will be evident that the shoes will be forced to travel inwardly toward each other at a proportionately greater rate than the relative inward movement of the main followers, thus placing the spring resistance under additional compression as a result of the differential wedge action. The inward movement of the follower A will continue until the front and rear ends of the friction shoes C abut the inner faces of the end walls of the respective followers and the inner ends of the top and bottom walls of the followers abut the shoulders at 31 and 32 on the shoes, whereupon the shoes will act as a solid column transmitting the pressure from the front follower directly to the rear follower, thereby preventing the springs from being driven solid. During draft, the action of the mechanism will be the reverse of that just described, the rear follower being moved toward the front follower which is held stationary.

Upon removal of the actuating forces, the initial release action will take place between the shoes and the main followers due to the relatively blunt wedging angle therebetween, which permits the main followers to drop away from the shoes. The pressure between the shoes and the spring followers is thus relieved, permitting the spring to restore all of the parts to normal position.

When the parts are assembled, the spring E will preferably be placed under initial compression, and in actual practice, a clearance will be left between the outer sides of the shoes and the inner faces of the draft sills, and between the extreme outer ends of the friction shoes C and the outer ends of the spring followers, as clearly shown in Fig. 1, so that as wear occurs on the various surfaces, automatic compensation therefor will occur by the spring E slightly expanding and forcing the spring follower outwardly and the shoes laterally, to at all times maintain all the parts in proper contact.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear follower casings, said casings each being provided with a pair of inwardly extending diverging wedge faces arranged at a relatively blunt angle with reference to the longitudinal axis of the mechanism; of a pair of longitudinally arranged friction shoes, each having an inner and outer wedge face at each end thereof, the outer wedge faces of said shoes being adapted to coact with the wedge faces of said followers and correspondingly inclined thereto, said inner wedge faces being inclined at relatively keen angles with reference to the longitudinal axis of the mechanism; spring followers at opposite ends of the mechanism normally disposed entirely within said casings, said spring followers being provided with wedge faces correspondingly inclined to and adapted to cooperate with the inner wedge faces of said shoes; and a spring resistance coacting with said spring followers.

2. In a friction shock absorbing mechanism, the combination with front and rear main follower casings relatively movable toward each other, said follower casings each having a flat, transverse end wall and inwardly converging side walls, said side walls presenting wedge faces; of front and rear spring followers provided with wedge faces; a spring resistance coacting with said spring followers; a pair of laterally movable friction shoes, said shoes having wedge faces coacting with the wedge faces of said main follower casings and spring followers, the cooperating wedge faces of said follower casings and shoes being disposed at relatively blunt angles with reference to the longitudinal axis of the mechanism and the cooperating wedge faces of said spring followers and shoes being disposed at relatively keen angles with reference to said axis, said shoes also being provided with transverse, flat abutment faces adapted to engage the end walls of said casings to limit the relative inward movement of the latter, whereby said shoes are adapted to act as a solid column-load-sustaining means and transfer the actuating force directly from the front follower to the rear follower when the mechanism is fully compressed.

In witness that I claim the foregoing I have hereunto subscribed my name this 23rd day of April 1923.

JOHN F. O'CONNOR.